Figure 5:
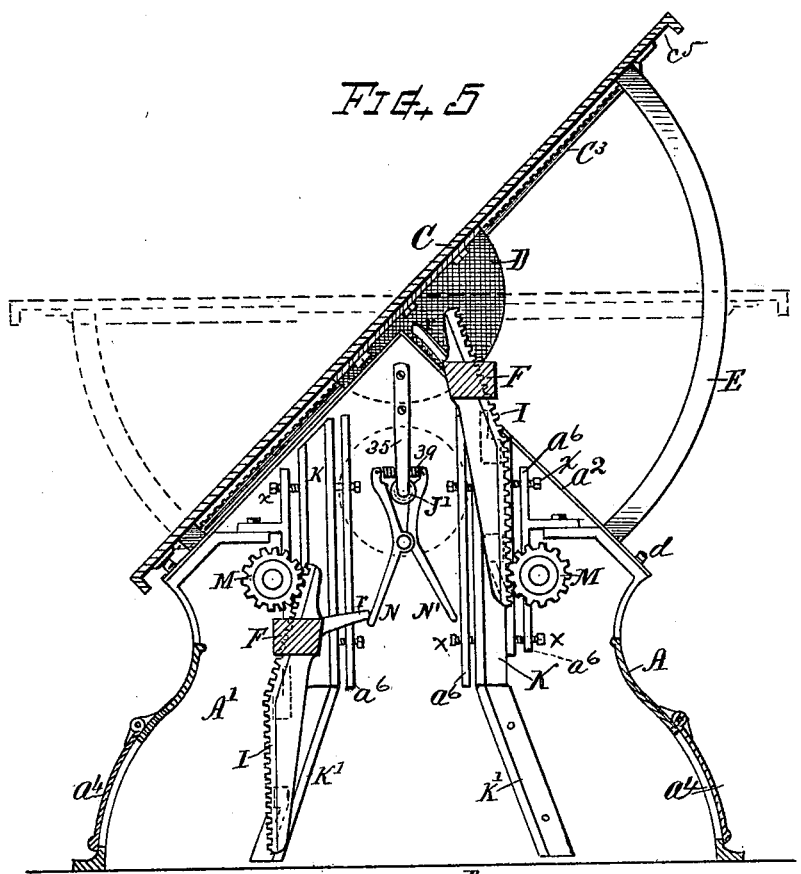

No. 623,786. Patented Apr. 25, 1899.
F. A. HUMPHREY.
CIRCULAR SAW MACHINE.
(Application filed Aug. 27, 1896.)
(No Model.) 9 Sheets—Sheet 1.
FIG. 1
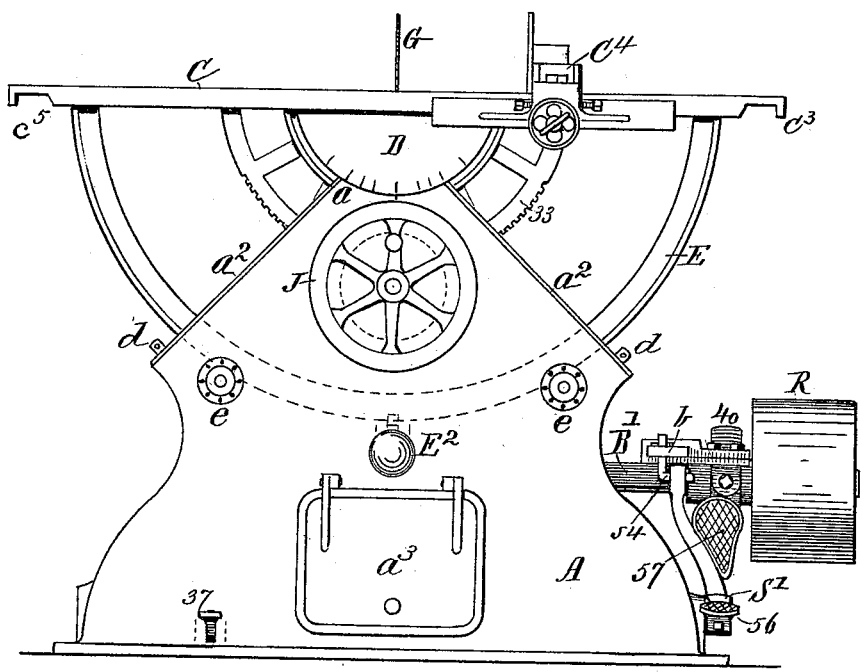
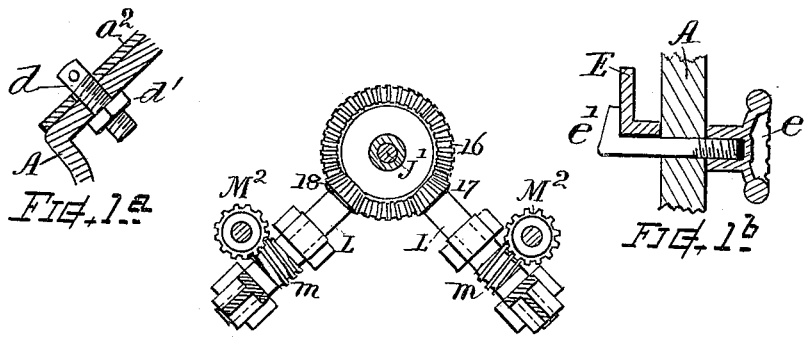
FIG. 1ᵃ FIG. 2 FIG. 1ᵇ
Witnesses. Inventor.
Charles A. Bacon Frank A. Humphrey
W. Back By Chas. H. Burleigh
Attorney

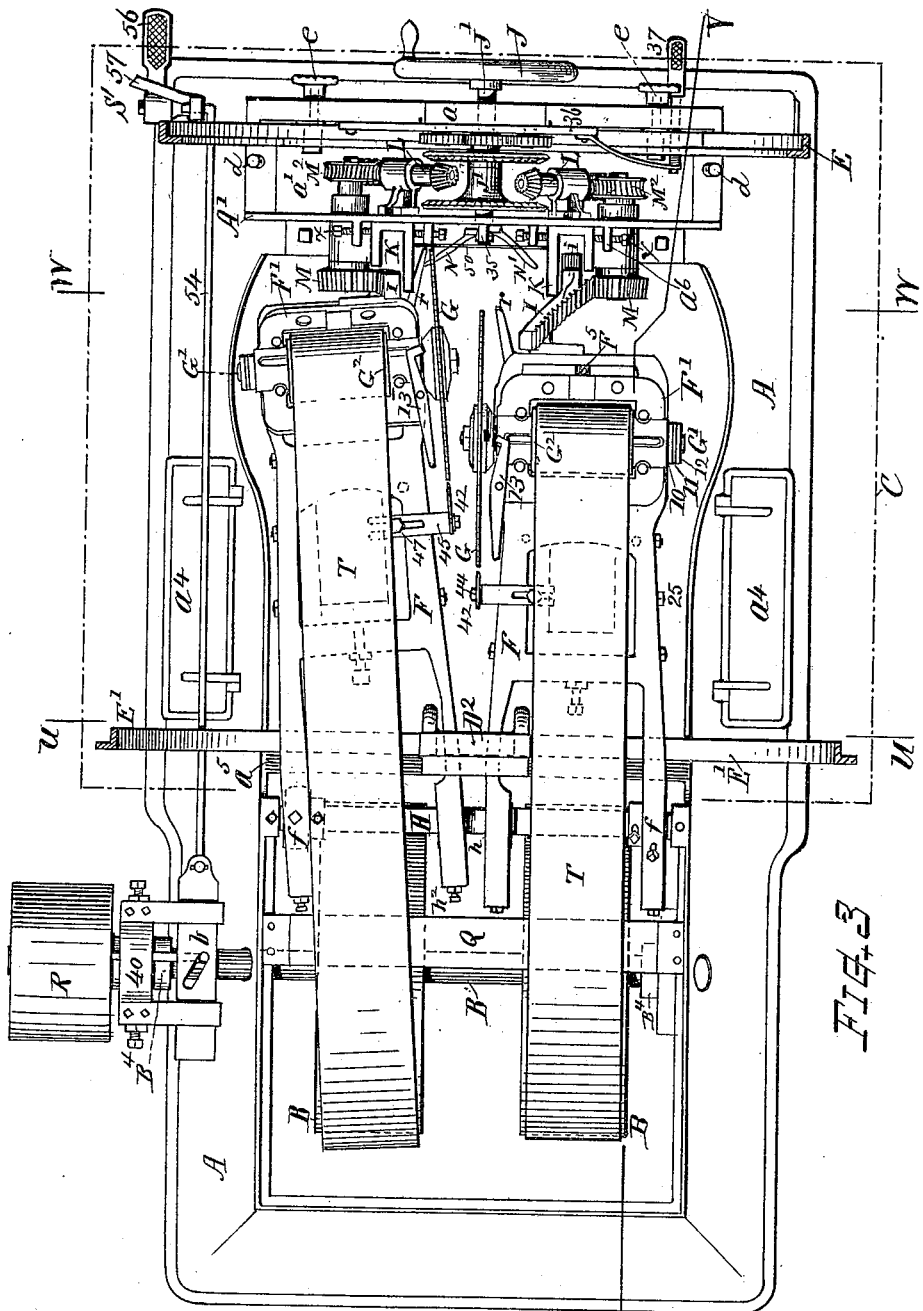

No. 623,786. Patented Apr. 25, 1899.
F. A. HUMPHREY.
CIRCULAR SAW MACHINE.
(Application filed Aug. 27, 1896.)
(No Model.) 9 Sheets—Sheet 3.
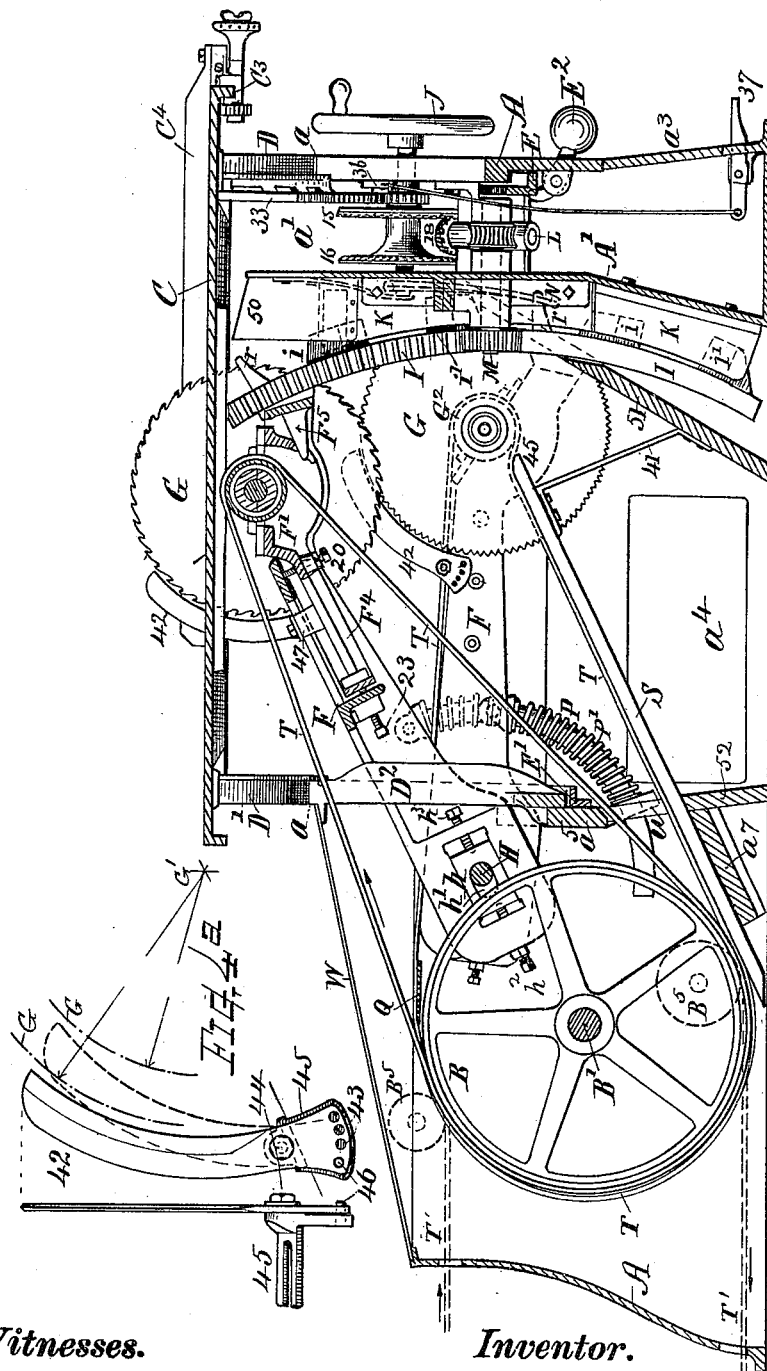
Witnesses. Inventor.

No. 623,786. Patented Apr. 25, 1899.
F. A. HUMPHREY.
CIRCULAR SAW MACHINE.
(Application filed Aug. 27, 1896.)
(No Model.) 9 Sheets—Sheet 4.

Witnesses. Inventor.
Charles S. Bacon Frank A. Humphrey,
W. F. Back By Chas. H. Burleigh
Attorney

THE NORRIS PETERS CO., PHOTO-LITHO., WASHINGTON, D. C.

No. 623,786. Patented Apr. 25, 1899.
F. A. HUMPHREY.
CIRCULAR SAW MACHINE.
(Application filed Aug. 27, 1898.)
(No Model.) 9 Sheets—Sheet 5.
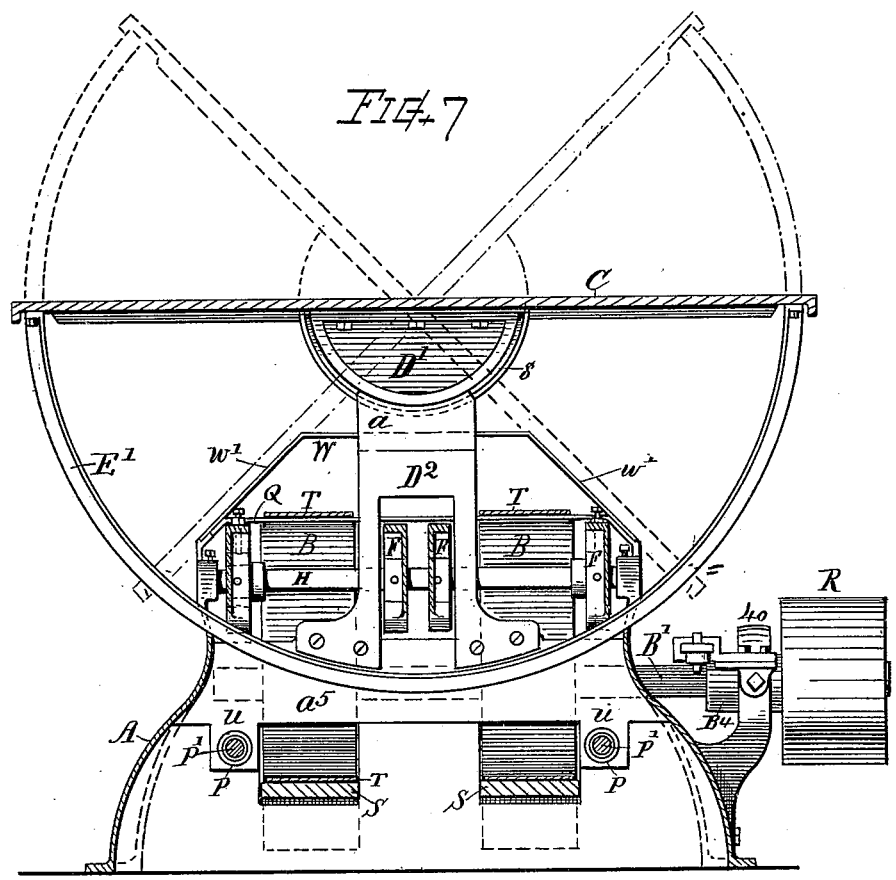
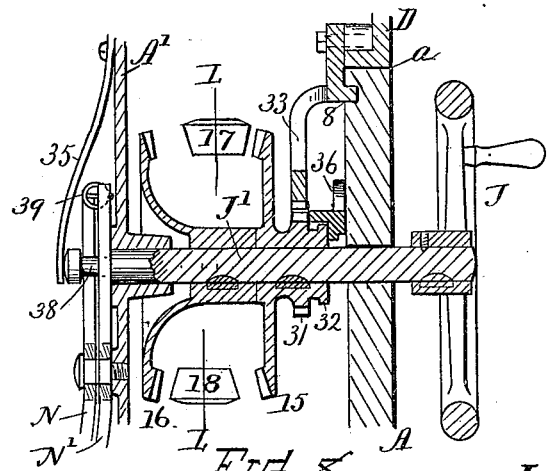
Witnesses. Inventor.

No. 623,786. Patented Apr. 25, 1899.
F. A. HUMPHREY.
CIRCULAR SAW MACHINE.
(Application filed Aug. 27, 1896.)

(No Model.) 9 Sheets—Sheet 6.

Witnesses.
Charles H. Bacon
W. Buck

Inventor.
Frank A. Humphrey
By Chas. H. Burleigh
Attorney

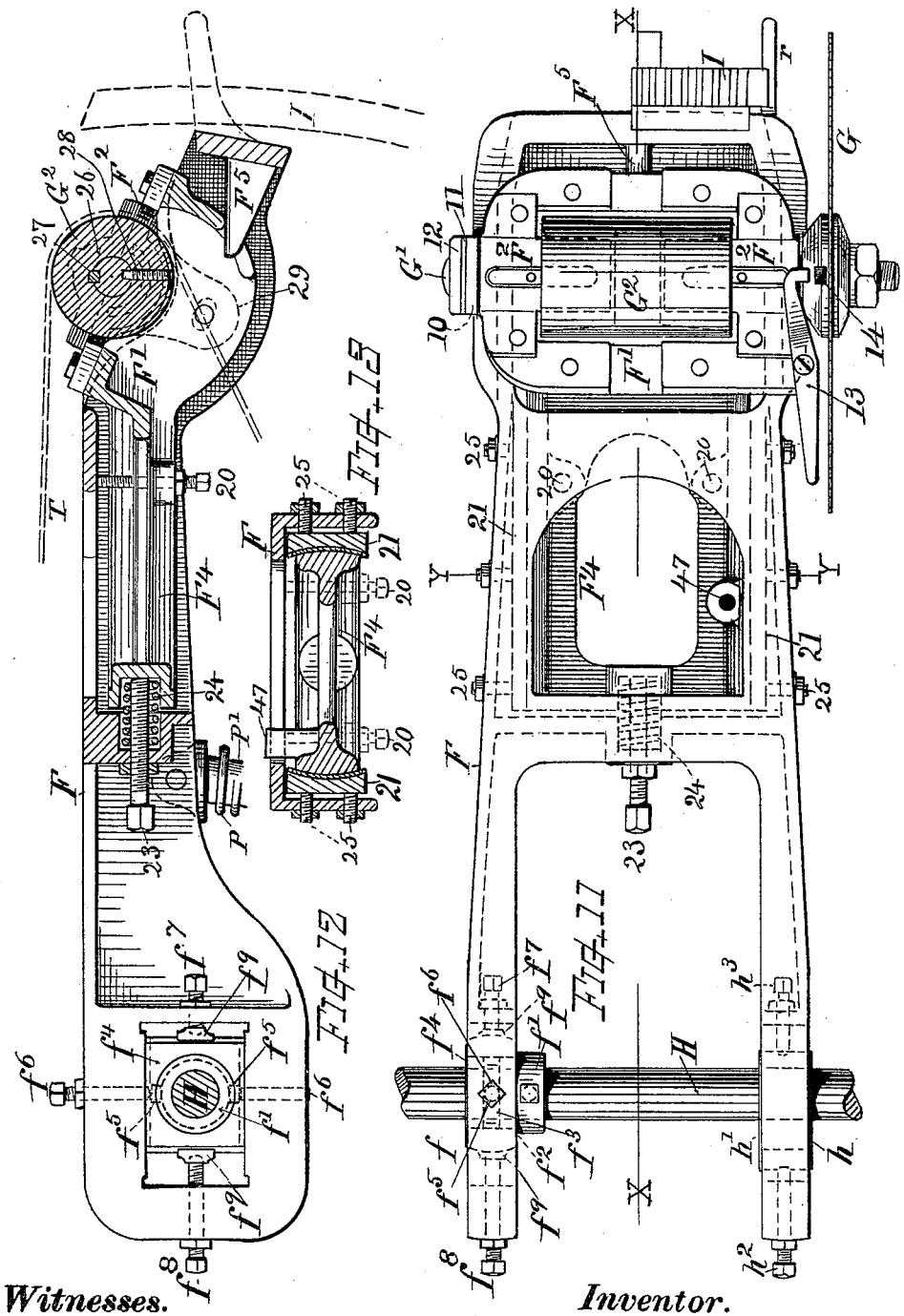

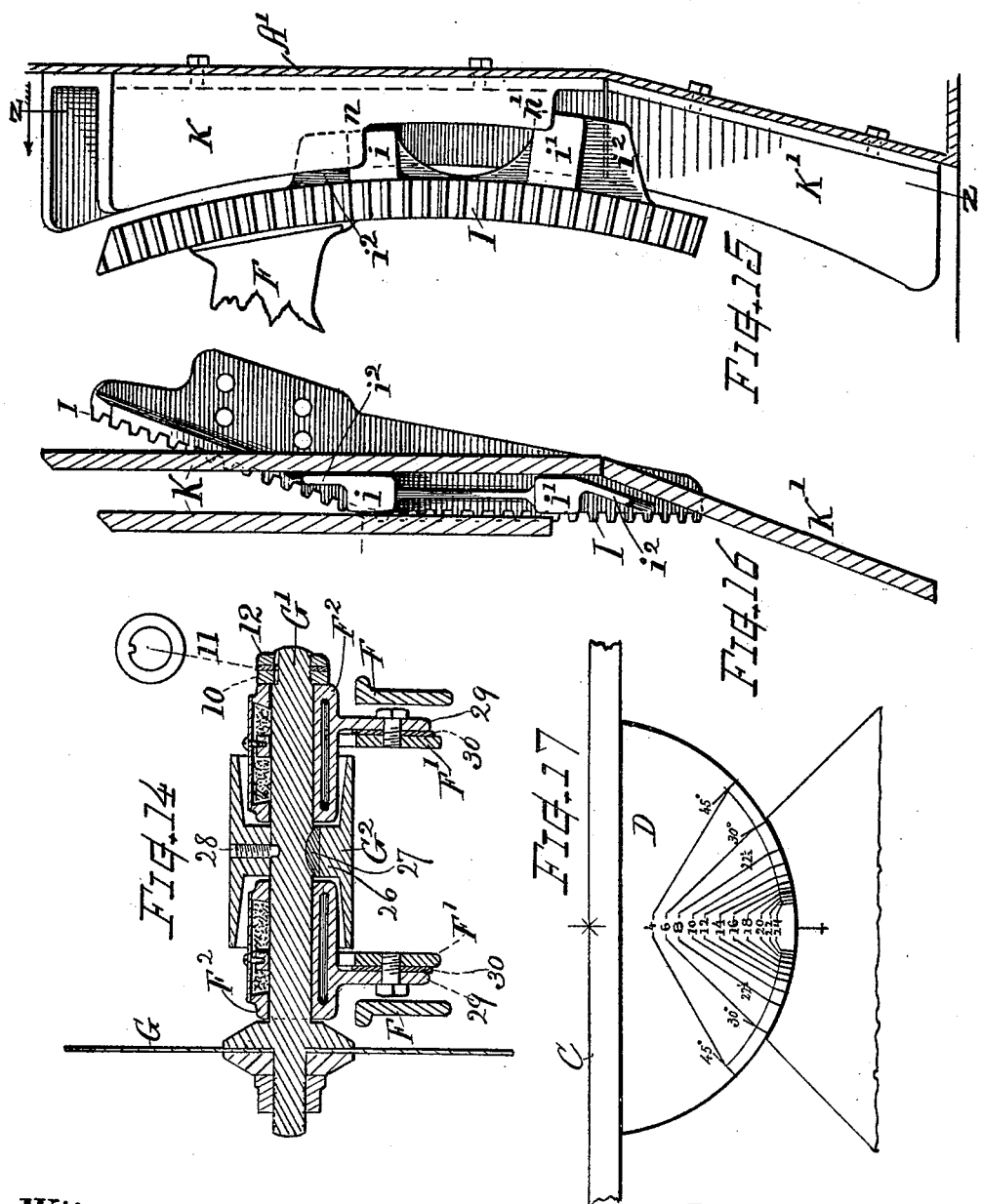

No. 623,786. Patented Apr. 25, 1899.
F. A. HUMPHREY.
CIRCULAR SAW MACHINE.
(Application filed Aug. 27, 1896.)
(No Model.) 9 Sheets—Sheet 9.

Witnesses. Charles S. Bacon, Waldo E. Buck.

Inventor. Frank A. Humphrey By Chas. H. Burleigh Attorney

UNITED STATES PATENT OFFICE.

FRANK A. HUMPHREY, OF WORCESTER, MASSACHUSETTS, ASSIGNOR, BY MESNE ASSIGNMENTS, TO KATE AUGUSTA HUMPHREY, OF SAME PLACE.

CIRCULAR-SAW MACHINE.

SPECIFICATION forming part of Letters Patent No. 623,786, dated April 25, 1899.

Application filed August 27, 1896. Serial No. 604,125. (No model.)

*To all whom it may concern:*

Be it known that I, FRANK A. HUMPHREY, a citizen of the United States, residing at Worcester, in the county of Worcester and State of Massachusetts, have invented a new and useful Circular-Saw Machine, of which the following, together with the accompanying drawings, is a specification sufficiently full, clear, and exact to enable persons skilled in the art to which this invention appertains to make and use the same.

My invention relates to the construction of various parts of the mechanism in detail; also, to the combinations and arrangement of various parts of the mechanism for operation, substantially as hereinafter more fully set forth, the object being to provide a sawing-machine having a plurality of circular saws with carriers and shifting devices adapted for bringing said saws alternately to a common working position at the central opening of a work-supporting table that is adapted for tilting adjustment to both right and left inclination relatively to the plane of the saw when at working position; also, to render the circular-saw machine more efficient and convenient than those heretofore in use and readily adjustable in its various parts in a manner to meet the varied requirements of use.

Another object is to provide a machine having a plurality of circular saws adapted for ready alternate adjustment to the same working position, and a tiltable table capable of adjustment to both right and left inclination and available for use at any desired degree within a limit of forty-five degrees right or left from the working plane of the saws and means for supporting the table at such adjustments.

Another object is to provide an oppositely-tilting saw-table with a gravity-latch or means for stopping and normally retaining said table at its central horizontal position.

Another object is to adapt the mechanism for automatically putting the respective saws into and out of rotative action simply by the act of shifting the saws to and from their working position through the throat of the table.

Another object is to provide in a circular-saw machine a swinging carrier having a saw mounted thereon and means for elevating and lowering the saw by combined vertical and lateral motion, whereby the saw is brought to the proper working plane when at its upper position and thrown to one side of said plane when at lowered position.

Another object is to provide a system of gearing for severally operating the respective saw-elevating mechanisms by means of a single hand-wheel shaft; also, to combine therewith means for tilting the table by operation of the same hand-shaft and to afford facilities of adjustment for bringing the hand-shaft into connection with either of the respective mechanisms to be operated.

Another object is the arrangement of a rotatable arbor, a swinging carrier therefor, the operating shaft and pulley, and a direct arbor-driving belt from the operating-pulley to the arbor-pulley in such manner that the belt and arbor can be automatically put into operative motion by the mere shifting of the carrier for bringing the arbor to its working position and relieved from operative motion by the shifting of the carrier and arbor away from working position, as more fully hereinafter explained.

Another object is to provide means for preventing or resisting the elevation of one of the saw-carriers except when the other saw-carrier is in depressed or idle position, thereby obviating liability of interference of the saws by the elevation of one while the other is in raised position.

Another object is to provide facilities for adjustment of the saw-arbor journal-box support or carrier-head in relation to the carrier-arm for bringing the plane of the saw into proper vertical relation and into alinement with the central axis of the tilting table; also, to provide means for adjustments of the bearing-support for regulating the belt tension.

Another object is to provide means for connecting the saw-carrier arm to its fulcrum-bar in a manner that will permit vertical and lateral swinging of the arm; also, lateral adjustment of the arm upon the bar and longitudinal adjustment of the joint-boxes.

Another object is to provide a rest for the saw-operating belt, located beneath the carrier-arm and adapted to serve as an arrester or brake for stopping the motion of the belt when the saw is lowered to its idle position.

Another object is to provide a saw-machine structure wherein the adjusting-gearing is inclosed within a compartment of the frame, separate from the saw-compartment, and protected from the accumulation of sawdust upon the gears.

Another object is to provide a guard for the back teeth of the saw, adapted for following the rise and fall of the carrier; also, to adapt such guard for alinement and to meet the requirements of different diameters of saws.

Another object is to provide a right and left tilting saw-table with a semicircular or segmental lag-joint scale.

Minor objects and features of my invention are explained in the following detailed description, the particular subject-matter claimed being hereinafter definitely specified.

Figure 6:
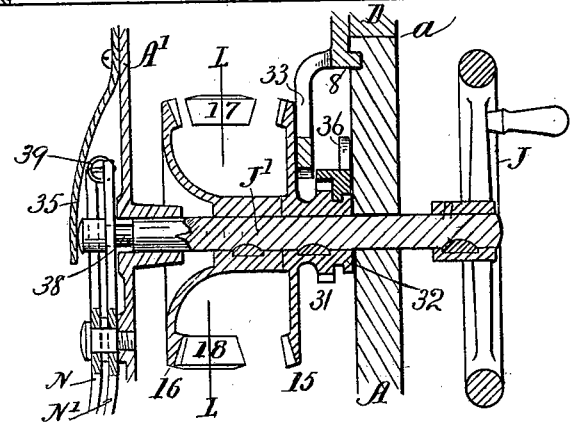
Figure 9:
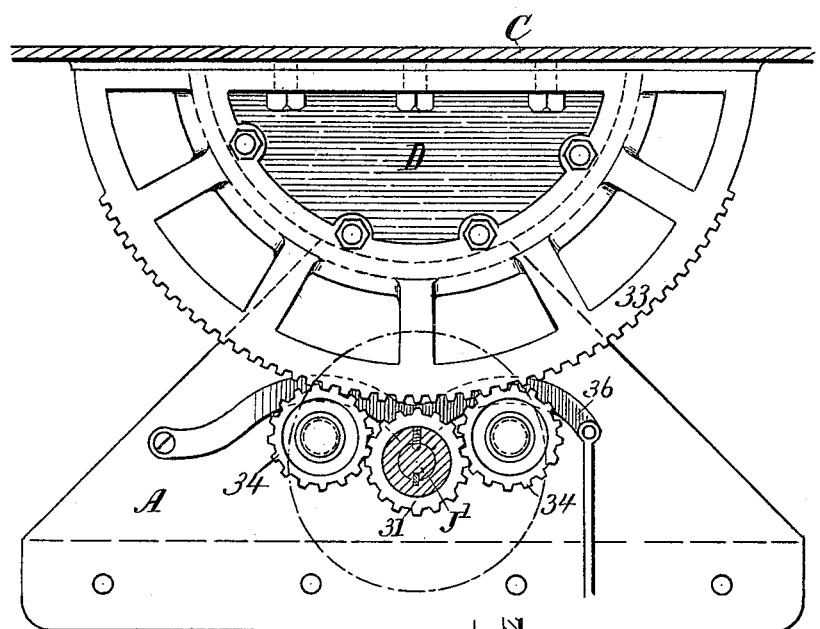
Figure 10:
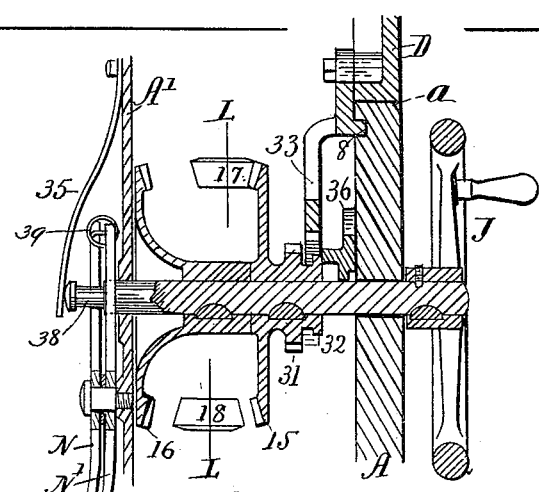
Figure 18:
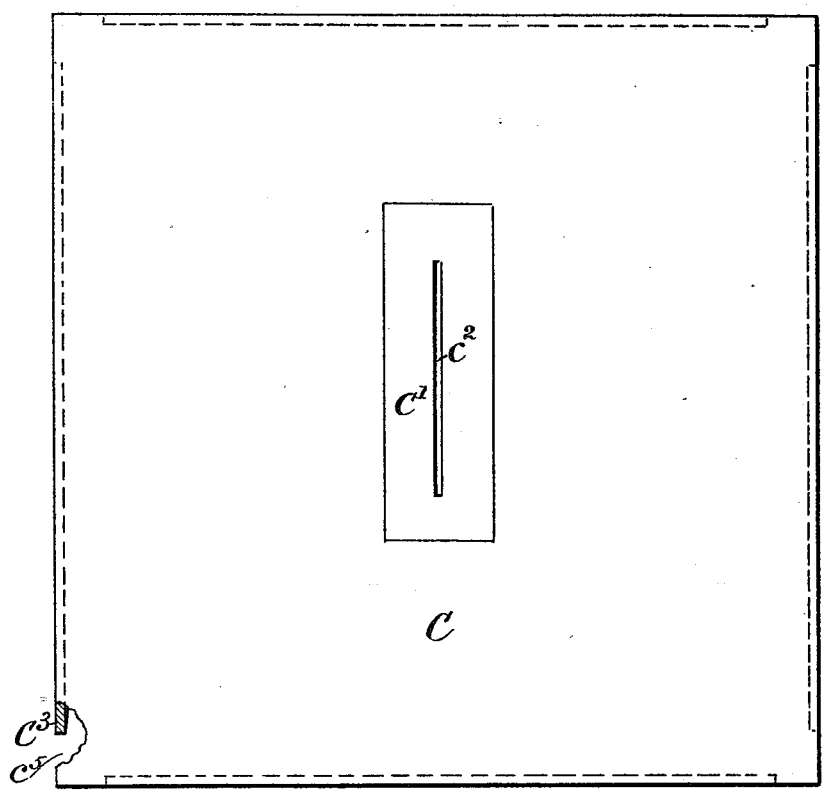
Figure 19:
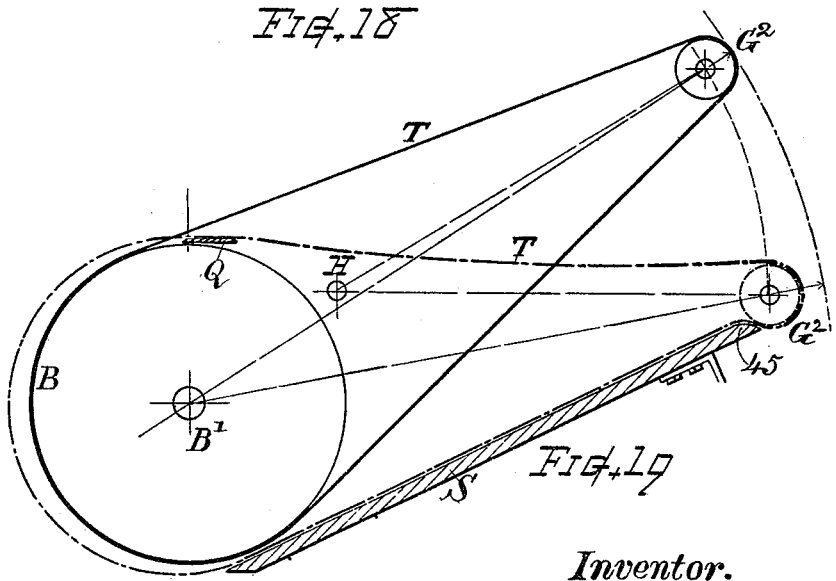

In the drawings, Figure 1 is a front end view of a machine embodying my invention. Fig. 1$^a$ is a detailed view of the adjustable tilt-stop. Fig. 1$^b$ is a detail view showing one of the table-holding clamps. Fig. 2 is a transverse sectional view showing a part of the gearing for adjusting the saw-carrier. Fig. 3 is a plan view of the machine with the table-top and rear covering-hood removed to reveal parts beneath. Fig. 4 is a longitudinal vertical section at line V V on Fig. 3. Fig. 4$^a$ shows the detail of the back guard for the saw by side and front views. Fig. 5 is a transverse vertical section at line W W looking toward the front, with the dust-shield omitted, showing the carrier-guides, racks, and other mechanism at the rear of the partition-plate. Fig. 6 is a sectional detail view of the hand-shaft and its gearing at first position of adjustment. Fig. 7 is a transverse vertical section at line $u\ u$ on Fig. 3 looking toward the rear and showing the fulcrum-bar, the rear ends of the carriers and carrier-springs, and the support for the rear end of the table. Fig. 8 is a sectional detail view of the hand-shaft and its gearing at second position of adjustment. Fig. 9 is a detail rear view of a system of table-tilting gearing in combination with the hand-shaft. Fig. 10 shows the sectional detail view of the hand-shaft and its gearing at third position of adjustment. Fig. 11 is a separate plan view of the saw-carrier arm. Fig. 12 is a longitudinal section of the same at line X X on Fig. 11. Fig. 13 is a transverse section of the arm at line Y Y on Fig. 11. Fig. 14 is a vertical section through the axis of the saw-arbor and transversely through the carrier-head. Fig. 15 is a separate side view of the carrier-elevating rack and its guiding devices; and Fig. 16 is a vertical section of the guideway at line $z\ z$ on Fig. 15, showing the front of the rack and its guiding-lugs. Fig. 17 is a front view of the table-supporting segment, showing the graduation for lagging-joint scale thereon. Fig. 18 is a plan view of the top of the table, one corner indicated broken away to show the end of the flange; and Fig. 19 is a diagram illustrating the action of the arbor-operating belts.

Referring to parts, A denotes the main frame, which is of metal, preferably made as an oblong crib or curb to stand upon the floor with a flanged base and having inwardly-curved side walls of suitable height to receive the sawdust and to inclose various portions of the mechanism, as illustrated. The front end of the frame projects above the sides and is fitted with converging top edges and a central concave circular seating-surface $a$. At a short distance back from the front end of the frame an upright guard plate or partition A' is arranged across the interior space, forming a barrier in front of the saws and inclosing a chamber $a'$ for the adjusting-gearing and affording a compartment for tools and appurtenances at the lower part thereof. The top of said partition has inclined edges to match the front end of the frame, but extending to a central point at the top. Removable cap-plates $a^2$ are arranged to rest upon said inclined edges for covering the gear-inclosing chamber. A door $a^3$ is provided in the end of the frame opening into the tool-chamber. The rear part of the frame is adapted for supporting the bearings of the operating-shaft B', having the operating-pulleys B arranged thereon and to serve as a base for a removable sheet-metal hood which is arranged over said pulleys, as hereinafter explained. The frame is provided with side doors or openings $a^4$ of suitable size for the introduction of a scoop-shovel or for the attachment of the flanged head of an exhaust-conductor for the removal of sawdust from the inner compartment.

The table C or work-supporting platform consists of a single rectangular plate of metal having a central space with a removable throat-block C', of wood or other suitable material, fitted therein, through which the saw-throat $c^2$ is cut, flared, or beveled on the under side. Said table is mounted upon the frame in a manner that will allow the tilting adjustment of the table-top in both directions either to the right or to the left about an axis approximately coincident with or represented by the line of intersection of the plane of the table-surface and the vertical central plane of the saw and to an inclination of forty-five degrees or any intermediate degree from its normal horizontal position, as indicated by dotted lines on Fig. 7 of the drawings. The top table-surface is made perfectly plain, without grooves or holes for the attachment of gages or guides $C^4$; but the edges of the table are formed square and with downwardly-projecting parallel flanges or ribs $C^3$, that receive and support the gages. Said flanges terminate before reaching the corner of the table, leaving an open space $c^5$ at each corner, as shown.

The table is upheld by semicircular rockers or segments D D', fixed to its under side and seated in the circular bearings $a$ at the top of the frame, the peripheral surface of the segments sliding in the bearings as the table is tilted. The circular bearing-joints at the junction of the supporting seats and segments are preferably provided with intermatching members or circular fillets and grooves 8, as best illustrated in Figs. 6, 8, and 10, for securely retaining the parts in connection with each other. Semicircular braces E and E' are attached to the under side of the table, which braces pass through the frame, one adjacent to the upright front and the other near the rear end of the table. Said latter semicircle E' serves as a correcting-truss for keeping the table-surface true. By spreading or contracting the curvature of the semicircle E' and securing its ends to the table-plate while in such condition the plate of the table is sustained against distortion of its plate-surface upward or downward, according to the direction of strain given such semicircle. The front brace E serves as a truss and in combination with clamp devices and hand-nuts $e$ $e$ serves for the retention of the table at positions of inclined adjustment. This clamp consists of an angle-headed bolt $e'$, that extends through the frame and engages the rear angle of the circle, (see Fig. 1$^b$,) drawing said circle firmly against the frame when the hand-nut is screwed up and releasing the circle when the nut is turned back. The hand-nuts $e$ are disposed upon the front end of the frame at either side, as shown, while at a central position there is provided a weighted latch E$^2$, pivotally supported in connection with the frame and adapted to engage a notch formed in the circle E for securely retaining the parts when the table is at its normal horizontal position. The ball or weight on the end of said latch projects at the front of the frame and can be lifted by the foot or toe of the operator for releasing the semicircle when it is desired to tilt the table. When the table is brought from tilted to horizontal position, the latch E$^2$ automatically falls into the notch, thereby indicating and maintaining the normal adjustment without special attention on the part of the operator. The semicircle E may in some instances, if desired, be notched at other positions for retaining adjustment of the table at the most frequently used angles of inclination; but it is deemed the better practice to retain all angular adjustments of the table by the clamp device $e$ and the horizontal position by the positive gravity-latch E$^2$.

The bearing-seat $a$ for the rear end segment D' of the table is formed upon or carried by a bifurcated upright standard D$^2$, the foot of which is supported upon a cross-girth $a^5$, fixed in the frame forward of the operating-pulleys and within the circuit of the saw-belts. The two limbs of the standard pass up through the openings of the saw-carrier arms, said limbs being formed broad from front to rear and laterally narrow, as illustrated. By this peculiar structure and manner of combining the standard with the carriers the difficulty of supporting the rear end of a tilting saw-table without interfering with the action of the saw-carrier arms, the belts, or the table is overcome and an efficient support provided.

G G indicate the circular saws, the rotating arbors G' of which are mounted in right and left relation in bearings supported upon swinging arms or carriers F, fulcrumed at or near their rear ends, and arranged in a manner to afford an upward and downward swing of the arm with a combined vertical and a lateral motion at the fore end of the carrier of such character that the two saws can be alternately brought into the same plane or working position in the single central slit of the table or either or both lowered to a non-operative position within the frame. This method of and mechanism for bringing saws into and out of action are important features of my invention.

The carrier F preferably consists of a bifurcated skeleton arm having openings through its rear part for the reception of bearings or joint devices whereby said carrier is adjustably connected with the fulcrum bar or shaft H, that is rigidly supported within the frame just forward of the operating-pulleys B. The joint-bearing $f$ in the outer limb of the carrier is made as shown in Figs. 11, 12, and 13, and comprises a cylindrical sleeve $f'$, which is fixed upon the fulcrum-bar H and held from rotation by a set-screw, spline, or other suitable fastening. Said sleeve is formed with a shoulder $f^2$ and a circumferential groove $f^3$ about its body. Mounted upon said sleeve there is a bearing-box $f^4$, having straight top and bottom edges with longitudinal grooves therein and cylindrical end surfaces. Said box is retained upon the sleeve adjacent to the shoulder $f^2$ by pins or screws at $f^5$, inserted through the straight sides, with their points extending into the groove in the sleeve. This allows the box to oscillate upon the sleeve, but prevents lateral movement except by adjustment of the sleeve longitudinally upon the fulcrum-bar H, which adjustment can be effected when desired by loosening its set-screw and shifting the sleeve, together with the carrier-arm and parts mounted thereon, more or less to the right or left. The bearing-box $f^4$ is fitted within a longitudinal opening in the carrier-arm F, and is there confined by pins or screws $f^6$, that are inserted through the top and bottom of the carrier-arm, with their points engaging in the grooves at the top and bottom of the box $f^4$, thereby affording swiveling action of the arm upon the bearing-box. The box $f^4$ is adjustable endwise in the opening of the carrier-arm F, and longitudinally-disposed adjusting-screws $f^7$ and $f^8$ are threaded in the metal of the arm and turned in against bearing-shoes $f^9$, fitted to the cylindrical ends of the bearing-box $f^4$, thereby holding the parts in proper relation of endwise adjustment, while permitting the carrier-arm to have lateral swing movement upon the bearing-box. This joint $f$ maintains the fulcrum relation of the carrier-arm F at a given position of its length, affords adjustment both laterally and longitudinally, and provides for the carrier a hinging action both vertically and laterally as the saw is elevated and lowered.

The joint bearing in the inner limb of the carrier-arm is made as a rectangular box $h$, having an oblong hole $h'$ transversely through it, the lesser dimension of which fits the diameter of the shaft or fulcrum bar H. Said box $h$ is fitted in a longitudinal opening in the carrier-arm and is adjustably retained by set-screws $h^2$ and $h^3$, threaded in the metal of the arm and having their ends engaged in depressions or recesses formed therefor in the two ends of the box, Figs. 4 and 11. This joint confines the carrier-arm F against any transverse rocking movement, while permitting the relative endwise movement of the inner limb necessary to accommodate the lateral swing of the carrier-arm about the pivotal axis, which is in the outer limb, as above described. It also affords a firm support when the saw is elevated to working position by reason of the inner surface of the bearing-box opening abutting against the fulcrum-bar H. The abutting force of this bearing-joint can be accurately regulated by endwise adjustment of the box $h$ within the limb of the carrier-arm by means of the set-screws $h^2$ and $h^3$.

The carrier-arm may in some instances be joined with its fulcrum-bar in suitable manner to accommodate the swinging action of said arm to elevate the saw, but without the appliances for effecting the endwise adjustment of the arm in relation to the fulcrum-axis. The construction shown is, however, a preferable method of hinging the parts. Each of the carriers is provided with a toothed segment or rack I, by means of which, in connection with suitable gearing, the carriers, together with the arbors and saws, are raised and depressed. Such gearing is hereinafter more fully described.

The rotatable arbor, having the saw G mounted thereon, is carried upon the swinging fore end of the carrier-arm F. The bearing-boxes for said arbor are preferably attached to a support that is adjustably connected with the carrier-arm or to a head that forms an adjustable part of said arm, and suitable regulating-screws 20 are provided for effecting and retaining lateral oscillative variation of the arbor-supports relatively to the rear portion of the carrier-arm and also an adjustment of the arbor in a direction longitudinal of the arm. For attaining this result in the present instance the carrier-arm F is provided with the adjustable head F', upon which the journal-boxes F² for the saw-arbor G' are mounted, as shown. Said head has a rearward extension or neck F⁴ fitted in cylindrical sectional bearings 21 between the side bars of the carrier-arm (see Figs. 11, 12, and 13) in a way to afford lateral oscillative adjustment of the neck and head as controlled by set-screws 20, threaded into the sides of the head or neck and impinging against flanges of the arm or in other suitable position. Longitudinal adjustment of the head is controlled by a screw 23, arranged through the cross-bars in the arm F, with its end bearing against the end of the neck F⁴, by means of which the effective working length of the carrier-arm can be adjusted for varying the tension of the operating-belt.

In some instances the cross-bar and the neck are chambered about the screw 23, as shown in Fig. 12, and a coiled spring 24 is arranged in said chamber to press forward the carrier-head away from the screw and to afford relief against too great strain upon the operating-belt when the saw is at its greatest elevation. This spring may, however, be omitted in some instances.

Set-screws 25 are provided in the sides of arm F, that screw in against the bearing-plates 21 for tightening or clamping the neck-joint, to take up looseness, or for rendering the parts of the carrier rigid in relation to each other.

A backwardly-projecting central wing F⁵ is provided upon the interior of the upper end of the carrier-arm, and the fore end of the head F' rests upon the rounded top edge of said wing. The top line of the wing stands parallel with the center line of longitudinal adjustment for the head, so that the wing serves as a support and a rocker-bearing for the arbor-supporting head in all its varied positions of longitudinal and oscillative adjustment.

The journal-boxes F² for the saw-arbor are supported upon the head F', as shown, (see Fig. 14,) the inner ends of the respective boxes extending within the belt-pulley G², which latter is formed hollow at the ends and joined to the arbor by a central web 26, thus making an arbor of the shortest practicable length, while giving ample length of journal-bearing and a sufficient attachment for the pulley to the arbor, the pulley and arbor being connected rigidly to each other by a spline 27 and an inserted pin or screw 28. The journal-boxes F² are each formed with laterally-projecting ears, that are bolted to the top of the carrier-head F', and with a downwardly-extending tongue 29 perpendicular to the axis, that is bolted to the upright side of the head, with a deadening packing substance 30 of medium density, as leather, wood, or fabric, introduced between the adjacent surfaces. By this structure and the packing 30 the injurious vibration or tremor of the arbor and saw while running is obviated and a very short arbor can be operated with a steady and unwavering rotation, giving the most perfect results in the operation of the saw.

The saw G is secured upon one end of the arbor G' by collars and nuts in well-known manner, the shoulder or back of the collar running against the end of the journal-box $F^2$. The opposite end of the arbor is screw-threaded and longitudinally grooved and is provided with a threaded adjusting-collar 10, an intermediate non-rotatable washer 11, and a threaded check-collar 12, the latter arranged thereon outside the washer. Said collars serve as means for regulating the endwise play of the arbor within its bearings. The threads on the arbors are respectively right and left, according to the requirements of the right or left saw. For retaining the arbor against rotation when removing and replacing saws thereon there is provided a swinging lever-dog 13, centrally pivoted upon the journal-box or carrier-head adjacent to the saw. (See Figs. 3 and 11.) One end of said dog is adapted to hook into a notch or recess 14, formed in the periphery of the saw-supporting collar, and the other end projecting forward to a position where it can be reached by a wrench-bar or any suitable instrument through the throat-block opening in the table for forcing said dog out of engagement with the collar. The throat-block C' is made readily removable from the table to facilitate the change of saws upon the arbors, and when said throat-block is removed access is given to the dog 13 and the saw-retaining nut.

In the drawings, Figs. 3, 4, and 5, the parts are shown with one of the saws elevated or at working position and the other lowered to idle position at some distance beneath the table. Either of the saws can in similar manner be elevated for use at will by swinging up its carrier-arm. For lifting the carrier-arms and raising the saws to their working position and again lowering them to their idle position a system of gearing is provided operated by a hand-wheel J at the front of the machine. The upright curved racks I, attached to the front ends of the respective carrier-arms, are disposed in right and left relation to correspond with the right and left saws and their operating mechanism and being of similar structure description of one will apply to each. The carrier-arm is rigidly attached to the rack near its upper end. The rack is formed with its toothed face on different planes, the toothed face of its lower portion in a vertical plane and the toothed face of its upper portion offset or inwardly inclined toward the upper extremity.

Upon the front edge of each rack-bar there are provided two guide-lugs $i$ and $i'$, that slide in a guideway K, supported upon the upright partition or guard plate A' near the front of the frame, the plate being preferably provided with upright flanges $a^6$ and the guideways adjustably secured therein by set-screws $x$ in a manner to facilitate the adjustment of the guideway K, so as to direct the saw-carrier to bring up the saw accurately into the central vertical plane in alinement with the tilting axis of the table. The guideway K is made in two pieces—an upper portion that is arranged approximately vertical in position and a lower portion K', that is arranged oblique or outwardly inclined to correspond in degree of offset and length with the offset of the rack I. The guide-lugs $i$ and $i'$ are made of unequal length, the upper one being shorter than the lower one. Each lug is preferably formed with an extension or lip $i^2$ (see Fig. 16) to give greater bearing-surface at its inner side. The guideway is made with a full flange at its inner side, while the outer guideway-flange is cut away or formed with offsets $n$ $n'$, that release the guiding-lugs $i$ $i'$ of the rack at a given position in the downward movement to allow the lateral movement of the rack and saw-carrier, as more fully hereinafter described. The guideway-flange and its cut-away portions are so formed and proportioned that the two lugs are simultaneously released at the instant the lower lug strikes the inclined surface upon the lower inner portion of the guideway and just as the offset of the rack reaches the operating-pinion.

Operating-pinions M for working the racks I are mounted upon the rear ends of short shafts that pass through the guard-plate and turn in bearings fixed to said plate, one shaft for each of the racks. The shaft and pinion are arranged in relation to the height of the mechanism, so as to accommodate the offset or lateral movement of the rack and carrier-arm after the saw has been lowered sufficiently to fully clear the throat-opening in the table. The offset in the rack may be more or less abrupt for giving lateral movement in the proper time desired.

The means for controlling and operating the saw-elevating mechanism is an important feature of my invention. It comprises an endwise-shifting hand-shaft J', arranged through suitable bearings on the frame A and partition-plate A' and having the crank or hand wheel J for rotating said shaft fixed on its end outside the frame. Two oppositely-facing beveled gears 15 and 16 are fixed on the shaft J' between the frame and partition-plate, and two obliquely-disposed shafts L are supported in suitable bearings within the gear-chamber $a'$, each having at one end a beveled pinion 17 and 18, adapted for engaging the respective hand-shaft gears, and at their other ends provided with worm-screws $m$, that engage with worm-gears $M^2$, fixed on the pinion-shaft M', as indicated in Fig. 2. The axes of the two shafts L L are disposed in different planes, so that the gears 15 and 16 can engage, respectively, with but one of the pinions, and only one be engaged at the same time—the gear 15 for working the pinion 17 and the gear 16 for working the pinion 18.

The hand-shaft is movable endwise, and the gears 15 and 16 are so placed thereon that when said shaft is pressed backward the front gear 15 will mesh with the pinion 17 for operating the saw-adjusting mechanism at the right-hand side of the machine, the rear gear being then out of mesh with the pinion at the left. When the hand-shaft is pulled forward, the front gear is thrown out of mesh and the rear gear 16 is thrown into mesh with the pinions 18 for operating the saw-adjusting mechanism at the left-hand side of the machine. Thus either saw desired can be brought up into working position or lowered by means of the single hand-wheel.

The above-described arrangement of adjusting-gears can be employed for elevating saws in a machine having its table non-tiltable or to tilt by hand; but in the present or any instance desired means for tilting the table by rotation of the hand-wheel J and shaft J' is provided, the mechanism for such purpose being organized as indicated in Figs. 1, 3, 6, 8, 9, and 10. The shaft J' is furnished with a toothed pinion 31 and grooved hub 32, which may be integral with the gear 15 or separately fixed to the shaft. A toothed semicircle or segment 33 is fixed to the table C or its supporting-segment and depends in position to engage with an intermediate gear (or gears) 34, supported by suitable studs on the frame A at position to mesh with the pinion 31 when the latter is shifted into line therewith. (See Figs. 9 and 10.)

A suitable spring 35 is provided for pressing the hand-shaft J' forward, preferably a flat spring secured to the guard-plate and acting against the rear end of the shaft; but a coiled spring on the shaft may be employed.

A drop bar or latch 36 is arranged at the end of the gear-hub adjacent to the inner face of the frame for retaining the parts at adjusted position in opposition to the spring 35 to hold the mechanism as set for working the table tilt-gear or the respective saw-carriers. Said drop-bar is connected by a rod with a small foot-lever 37, pivoted in the lower part of the frame, whereby the drop-bar can be raised for releasing the shaft and gears by the operator placing his toe upon said foot-lever. The engaging part of the drop-bar is formed with an offset step or shoulder and a downward lip adapted to engage the circumferential groove formed in the hub when the hand-shaft is at forward position for locking the shaft and retaining the parts when in gear with the left-hand saw-carrier mechanism. This lip and interlocking groove may not in all instances be employed, as the spring 35 tends to keep the parts at forward position; but said lip and groove afford a positive hold against liability of the gears crowding out of mesh.

The several positions or shifts of the hand-shaft are shown by Figs. 6, 8, and 10. The relative axial planes of the shafts L and bevel-pinions for working the right and the left saw-elevating mechanisms are indicated above and below the figure at 17 and 18 to more clearly illustrate the intermeshing positions of the gearing, although in practice such pinions are both below the hand-shaft axis, as shown in Fig. 2. In Fig. 6 the mechanism is shown at first position—the hand wheel and shaft thrown forward, the drop-bar engaging the grooved hub, and the gear 16 in mesh with the pinion 18. When the parts are in this position, the rotation of the hand-wheel J will operate the saw-carrier mechanism at the left-hand side of the machine for moving its saw into or from working position. In Fig. 8 the mechanism is shown at the second position—the hand wheel and shaft moved back for a short distance, the shoulder of the drop-bar engaging the end of the gear-hub, and both gears 15 and 16 out of mesh or disengaged from the pinions 17 and 18, but with the pinion 31 in mesh with the table tilt-gear 33 34. When the parts are in this position, the tilting of the table can be effected by rotation of the hand-wheel J, thereby enabling the operator to accurately set the tilt or angle of the table to the graduation-lines marked on the face of the segment D and frame. In Fig. 10 the mechanism is shown at the third position—the hand wheel and shaft pressed back to the full limit of movement, the full width of the drop-bar inserted between the frame and end of the gear-hub, and the gear 15 engaging the pinion 17. When in this position, rotation of the hand-wheel J will operate the saw-carrier mechanism at the right-hand side of the machine for moving its saw into and from working position.

Another feature of invention consists in combining with the saw-carriers and their operating-gearing means for preventing the elevation of one saw except when the other saw is down at its idle position and out of the way from interfering with the one intended to be raised into working position. Pivoted upon the guard-plate or partition A' there is a pair of levers N and N', the top arms of which are adapted to alternately or singly enter a groove 38, formed around the hand-shaft J', the respective lever-arms being in different planes or offset from each other, and the groove open to an extent corresponding with the endwise movement of the hand-shaft, so that one lever can fall into the groove 38 when the hand-shaft is pressed backward and the other lever can fall into the groove when the hand-shaft is drawn forward. A suitable spring 39 is provided for normally pressing the top arms of said levers toward the shaft J' and at the same time spreading the lower arms. Said spring in the present instance is of coiled wire, connecting the top ends of the levers with each other. The lower arms of said levers are curved rearward and stand at a position to be respectively engaged and retracted by means of the fingers r, attached to and projecting from the respective saw-carrier arms or their operating-racks I. When the saw-carriers are at depressed position, the levers are forced out of engagement with the groove of the hand-shaft and the elevating-gearing of either saw-carrier can be thrown into gear and operated; but when one of the saw-carriers is raised its finger r releases the lever N pertaining to that side, and such lever by falling into the groove 38 of the hand-shaft J' prevents said shaft from being shifted sufficiently far for throwing the elevating mechanism of the other saw-carrier into gear until the first carrier has been returned to depressed position. This interlocking mechanism is automatic and is out of reach of the attendant. Consequently it obviates all liability of the saws being brought into interference with each other by careless handling or intent on the part of the workmen.

The saw-carriers F are each provided with a counter-spring P for partially upholding the weight of the carrier and saw, thereby rendering the working of the elevating-gearing by means of the hand-wheel J easier for the operator. Said spring is best made as a coil arranged about a guiding rod or tube P', attached at its upper end to the carrier-arm F at a convenient position and having its lower end passed through a bracket or rest $u$, fixed on the cross-girth $a^5$. The upper end of the spring abuts against a suitable seat attached to the carrier-arm, while its lower end abuts against the fixed rest $u$, and the spring acts by its expansive force in opposition to the gravity of the carrier and parts connected therewith. The spring and its guide, as herein shown, are formed on a circular curve concentric with the fulcrum-axis H; but equivalent result may be effected with said spring disposed in a straight line from the arm F to the rest $u$, the point of its connection to the arm F being somewhat nearer the fore end of said arm.

Adjustable tilt-stops $d$ are arranged in the opposite inclined edges of the frame, which stops serve to arrest the tilting movement of the table at a limit accurately at forty-five degrees inclination right or left. Said stops each consists of a stud screw-threaded in the frame A and furnished with check-nuts $d'$, as shown in Fig. 1$^a$. The stud also serves for a support for the inclined cap-plate $a^2$, that covers the gear-chamber. The end of the stud is fitted to strike a spot on the under side of the table-top, and its head is perforated or squared for convenience of turning it in or out.

The operating-shaft B is mounted to turn in bearings $B^4$, that are adjustably swiveled in connection with their support, one arranged upon the main frame A and the other upon a bracket 40, attached to the outer side of the frame. These parts are preferably made so as to be set up either right or left—that is, with the drive-pulley R at either the right-hand or left-hand side of the machine, as any situation may demand. The operating-pulleys B are arranged on said shaft in line with the respective saw-arbor pulleys $G^2$ when the latter are in elevated or working position. Each of the operating-belts T extends around its pulleys in the manner illustrated, said belt passing forward over the carrier-arm and its fulcrum-bar, around the saw-arbor pulley $G^2$, and down through the carrier-head F' and forward part of the carrier-arm, thence backward beneath the carrier-arm, under the cross-girth $a^2$, and around the operating-pulley. The carrier-arm and its fulcrum-axis lie within the circuit of the belt, said fulcrum-axis being located somewhat above a direct line drawn from the axis of the operating-pulley to the axis of the saw-arbor. (See Figs. 4 and 19.) This method of arranging the carrier-arm and its fulcrum-axis, in combination with the operating-pulley, the driven pulley, and its operating-belt, is an important feature of my invention and effects its result in such manner that the act of elevating the saw into working position brings the saw into operative rotation and the act of lowering the saw to idle position causes cessation of the rotation. In this combination the relative arrangement of the operating-shaft B, the saw-arbor G', and the carrier-fulcrum H is such that the elevation of the saw to working position increases the distance between the axis of the operating-pulley and axis of the saw-arbor by reason of the differential in the axes of motion of the arbor-axis with the arm swinging from the fulcrum-axis and of the belt-loop about the arbor-pulley swinging from the operating-shaft axis, (see diagram Fig. 19,) while the depression of the carrier and saw to their idle position by a reverse action loosens the belt and allows its motion to cease. This differential action is made practicable as against the natural elongation or stretching of the belt in use by the adjustment of the carrier-head longitudinally upon the arm, as hereinbefore described.

Beneath each of the belts T there is a stationary rest or inclined board S, that receives and supports the lower portion of the belt when the saw is dropped to idle position. Said belt-rest is supported by a brace 41 at its front end, while its rear end rests upon and is secured to a cross-tie $a^7$ near the bottom of the frame and adjacently in front of the operating-pulley. The inclination and position of the rest-board S is such that the released belt will lie flat upon its surface, thereby causing the slack of the belt to be thrown rearward away from the face of the operating-pulley B. If desired, the belt-rest may be formed as a trough or with flanges at the side of the belt. The fore end of the rest-board is rounded on its top surface, as at 45, and placed at such height that when the arbor-pulley is at its lowest position the belt T is bent upward in rear of said pulley G, thereby creating sufficient friction to overcome the momentum of the belt and cause it to lie idle when the saw is in its depressed position.

A flat plate Q of thin metal, having its rear edge beveled upon the top surface, is arranged over the operating-pulleys. Said plate serves as a guard to prevent the belts when slack from causing friction upon the surface of said pulleys, as said operating-pulleys may be running while the belts are both idle, and in all instances one of said belts is always idle while the other belt and saw are in operation. The plate Q may be attached to the frame in any suitable manner. By the elevation of the saw-carrier the belt is raised free from the rest S and plate Q.

In some instances, as when the saws are employed for working hard varieties of woods, a longer saw-operating belt than that shown is desirable. In such instances the operating-shaft can be located at any desired position in rear of the machine, the belts T extended thereto, and pairs of guide-pulleys arranged in the rear part of the frame, as indicated by dotted lines at B⁵ on Fig. 4, for directing the belt in substantially the same relation to the saw-arbor, carrier-arm, and rest-board as here shown.

The guard for preventing blocks or pieces of material from striking or being caught upon the back teeth of the saw when used with the tilting table is arranged in the peculiar manner shown. Said guard 42 is formed as a flat forwardly-curved blade (see Figs. 4 and 4ᵃ) having a pivot-hole through its lower part and a series of small holes 43 along its lower end. The front of the guard is beveled to a thin edge along its upper part. Said guard is pivotally attached by a screw or bolt 44 to a bracket 45, that is adjustably connected to the carrier-head F' at 47, so as to move up and down with the carrier-arm or part upon which the saw-arbor is supported, the saw and its back-guard thus being together adjustable through the throat $c^2$ of the tilting table. The lower end of the guard-supporting bracket 45 is provided with a pin 46, that enters one of the holes 43 and retains the blade at position or from swinging on the bolt 44. The guard can be adjusted to stand more or less forward at its top relative to its point of fastening (see dotted lines, Fig. 4ᵃ) by loosening the bolt and setting the pin 46 in another of the holes 43, thereby readily adapting the guard for saws of different diameters. The holes 43 can be either in the blade or the bracket, as preferred, the pin or lug 46 being in the opposite part.

A sheet-metal hood W is provided for covering the operating pulleys and belts in rear of the table and protecting the same from the material and waste discharged from the saws. The front end of the hood is supported upon the flanged standard D², from which it slants backward to the top of the rear end. The sides $w'$ of the hood are respectively inclined downward at angles that will stand below the plane of the table-top C when the latter is tilted to the full limit of its inclined adjustment, the hood being so made as to offer no obstruction to long boards or pieces extending past the rear edge of the table when at any position of inclined adjustment. The lower edge of the inclined hood makes a close joint with the frame or hood-supporting base.

A shield 50 is provided for covering the top ends of the levers N, the springs 35 and 39, and the end of the hand-shaft in front of the saw-throat. The top of said shield, which is of sheet metal, is formed as an angular bonnet open toward the rear, with its apex adjacent to the under side of the table just forward of the saw and its sides extending laterally over the tops of the guideways K, said shield forming a gathering way or channel for receiving the sawdust and directing it downward into the central compartment of the crib-frame.

An inclined partition 51 extends across the interior of the frame and forms the front side of a bin for the accumulating sawdust and also separates the space into which the racks I descend from the sawdust-compartment. An inclined partition 52 is also arranged across the interior between the girth $a^5$ and the floor, which partition forms the rear end of the bin. These inclined partitions concentrate the sawdust at the central part of the crib, where it can be conveniently drawn out through the side openings.

The driving-pulley R is mounted on the operating-shaft B', with suitable clutch mechanism for connecting and disconnecting the same. The peculiar construction of the clutch mechanism for connecting the drive-pulley R with the operating-shaft is not a part of the present invention, it being sufficient for the purposes of the present machine that any suitable clutch may be used which is operative by the reciprocating plate $b$ in combination with the improved actuating devices specified. For operating said clutch I employ in connection with the shipper-rod 54 a double treadle S', that enables the operator to control the driving power while handling work upon the table. Said treadle consists of an angle-lever pivoted to the lower front corner of the frame and having a forwardly-projecting foot-pad 56 and an upwardly-projecting arm having an upright laterally-projecting foot-pad 57 fixed thereon, the upper end of said arm being pivotally connected with the shipper-rod 54, as illustrated. The operator can, while his hands are occupied, by pressing down the horizontal foot-pad swing forward the lever and throw the clutch into engagement, or by pressing back the upright foot-pad swing back the lever and throw the clutch out of action. The shipper-rod 54 extends rearward along the side of the frame and works a cam-plate or other attachment that moves the clutch. The foot-pads of the treadle are made reversible in their attachment to the lever, so that the same treadle can be set up either right hand or left hand to suit either side of the frame, accordingly as the driving-pulley may be required to be placed at the right or left to meet any situation.

In the operation of this machine the attendant has full control of the mechanism from his position in front of the machine. By observing the position of the hand-wheel he can readily determine with what parts the shifting mechanism is in gear. The operating pulley-shaft B is started by the attendant placing his toe upon the forwardly-projecting foot-pad 56. The left-hand saw is brought to working position by allowing the hand-wheel J to be pressed to its forward position by spring 35 and then revolving said wheel in the natural direction—that is, by turning it to the right—or if the right-hand saw is to be brought to working position it can be effected after the left-hand saw has been lowered to idle position by pressing back the hand-wheel J and then turning the hand-wheel in the same direction as before. When the hand-wheel and its shaft are to be shifted, the drop-bar 36 is raised for releasing said parts by the attendant placing his toe on the treadle 37 and depressing the same. Either one of the saws is put into rotative action automatically by the mere act of bringing it into working position and will efficiently operate with its teeth at any height above the level of the table-top. In reverse manner it is automatically put out of rotative action by the act of lowering it to idle position, thus requiring no shipper devices for stopping and starting the belts or any special attention therefor on the part of the attendant. If angular or beveled work is to be sawed, the attendant by raising the ball of the latch $E^2$ with his toe can then tilt the table-top with his hand to the required degree, either right or left, and there secure it by the clamp device $e$, or, if preferred, by adjusting the hand-wheel at its central position and then tilting the table by means of the hand-wheel and gears 31, 33, and 34, revolving said hand-wheel either to the right or left, accordingly as the table is to be tilted. If it is desired to stop the machine, the attendant can, by placing his foot against the laterally-projecting foot-pad 57, press back the lever and throw off the power from the operating-shaft B, and this can be conveniently done while his hands are both occupied in handling the work upon the saw-table.

The lag-joint scale (see Fig. 17) consists of graduations on the segment or dial differentially increasing in width right and left from the central position to correspond with a series of equal divisions of a circumference and having converging lines leading to a centrally-disposed series of figures indicating the number or divisor, thus showing the operator at a glance the position of adjustment right and left to which the machine-table may be tilted for making a perfect matching joint for any given number of lags to fill a circumference or circle, the width of lag for larger or smaller diameters being determined by the placement of the gage upon the table-top.

What I claim as of my invention, and desire to secure by Letters Patent, is—

1. In a circular-saw machine, the frame having the upwardly-projecting front end formed with uniform oppositely-converging top edges and a central circular seat thereon; in combination with the oppositely-tiltable table provided with a circular bearing-segment fitting said seat, a pair of circular saws having their arbors respectively mounted upon elevatable and depressible supports, and adapted for the alternate adjustment of said saws to a position for operating through the center of said table; and means for retaining the table in position of adjustment.

2. In a circular-saw machine, the frame having the upwardly-projecting front end and the upright guard-plate, with intervening space for the adjusting-gears, said frame and guard-plate respectively formed with oppositely-inclined converging top edges, and the removable cap-plates resting upon said converging edges and covering the gear-chamber, in combination with sawing mechanism, a tiltable table and the adjusting-gearing, substantially as set forth.

3. In a sawing-machine the combination, of a plurality of circular saws, means for shifting said saws to severally occupy a common plane when at working position, and separate planes when at idle position, a laterally-tiltable table movable about an axis coincident with the working plane of the saw, and means for securing said table at any degree of right or left inclination in relation to said saw; for the purpose set forth.

4. In a circular-saw machine, the combination, of the supporting-frame having the upright front with central circular bearings, a plurality of circular saws adjustably supported to alternately occupy a common plane at working position, the laterally-tiltable table centrally balanced on said frame and movable about a horizontal axle, at the intersection of the planes of the saw and table-surface, to tilt bodily in opposite directions from a normal horizontal position to right or left inclination in relation to the working plane of the saws, a semicircular sustaining-brace and an interlocking device, between said table and frame, adapted for automatically arresting the tilting movement at the normal horizontal position and rigidly holding said table, a projecting member at the front of the frame controllable by the operator for releasing the interlocked devices, and separate clamp devices, as described, on said frame, engageable with said brace for retaining said table at any inclined position, substantially as set forth.

5. The combination with a tiltable saw-table, of the trussing semicircle E′ having its ends secured to the under surface at or near the opposite sides of the table, and adapted, by the spread or contraction of its normal curvature, for exerting counteracting or corrective force upon the table-plate, substantially as set forth.

6. The combination, in a circular-saw machine, with the circular-saw disk, the main frame, and the saw-operating and saw-adjusting mechanisms therein; of the tiltable table-top centrally supported upon and by said frame and adapted for tilting adjustment right or left about an axis coincident with its surface-line at the plane of the saw, and a regulatable countercheck as the adjustable stop-stud $d$, at the inclined edge of the frame beneath the table, adapted for arresting and limiting the tilt motion of the table at the exact ultimate degree of inclination desired, substantially as set forth.

7. The combination, with a saw-table and a circular saw, of a movable carrier having the saw and its arbor supported thereon, said carrier adapted to have vertical movement for elevating or lowering said saw to or from its working position, means for shifting the carrier and saw laterally in relation to the working plane of the saw while passing from working to idle position, and vice versa, and means for operating said carrier, for the purpose set forth.

8. The combination, of the table having a single throat-opening, and supported for lateral tilting adjustment both to right and left inclination, a pair of circular saws, the swinging carriers whereon said saws are respectively mounted adapted to have a combined vertical and lateral movement, a fulcrum-support for the rear end of said carriers, and means for elevating and depressing the individual carriers, for the purpose set forth.

9. In a circular-saw machine, in combination, the operating shaft and pulleys, the carrier-arms pivotally supported at their rear ends, the saws and saw-arbors mounted in right and left relation upon the fore ends or heads of said carrier-arms, the operating-belts, the curved racks rigidly attached to said carriers, guides for said racks and carriers that direct the respective saws to the same working position, the pinions and gearing for moving said racks, and a work-supporting table having a single throat-opening, for the purposes set forth.

10. The combination of a work-supporting table adapted to have right and left tilting adjustment on an axial line coincident with its top surface, a pair of circular saws with arbors mounted in right and left relation upon elevatable and depressible carriers, guiding and operating mechanism for said saw-carriers whereby the saws when alternately elevated are brought into the same position with their plane coincident with the vertical plane of the tilting axis of the table, and when depressed laterally offset from said plane, and means for imparting rotative motion to said saws when elevated, substantially as set forth.

11. In a circular-saw machine, in combination, the saw-carrier arm supported at its rear end to permit lateral motion at its fore end, the rack laterally offset or having its toothed face formed on different planes, said rack attached to the fore end of the carrier, guide-lugs on said rack, and the rack-guiding way having a vertical portion and an offset portion; whereby said rack and the fore end of the carrier are given lateral motion when raised and depressed, the pinion for raising and depressing said rack, and operating gearing controlled by a hand-wheel or crank.

12. In a circular-saw machine, the guideway K formed in two parts, its lower part offset or laterally inclined, its outer side flange cut away as described, and the elevating-rack provided with forwardly-projecting lugs that engage in said guideway and are laterally released at the cut-away part of the guide; in combination with the saw-supporting carrier, and operating mechanism for moving said rack, substantially as set forth.

13. The combination, substantially as described, of the operating-shaft and its pulley, the saw-arbor and its pulley, the belt connecting said pulleys, the swinging carrier-arm having the arbor-supporting bearings mounted thereon, said carrier fulcrumed at its rear end upon a stationary axis forward of the operating-shaft pulley and above a plane passing through the pulley-axes, when elevated, means for raising and lowering the swinging end of said carrier, and the inclined stationary rest underlying said carrier-arm and extending tangentially from beneath the operating-pulley to the low position of the arbor-pulley, and presenting an arresting-surface against which the belt is brought into contact by depression of the carrier-arm; said mechanism being organized as set forth, wherein the starting and stopping of the belt, driven arbor and saw is effected automatically when said carrier is shifted, accordingly as the carrier and saw are elevated to working position or brought to depressed position.

14. In a circular-saw machine, the combination of the operating-shaft and pulleys, the fulcrum-bar, a pair of carrier-arms swinging on said fulcrum-bar, the saw-arbors mounted on said carrier-arms with their saws at the adjacent ends of said arbors, the operating-belts connecting the pulleys of the operating-shaft and saw-arbors, the curved racks attached to the carrier-arms, the guide-lugs on said racks, the offset guideways embracing said lugs, the pinions engaging said racks, the worm-gears on the pinion-shafts, the worm-shafts having worms that mesh with said gears and furnished with a beveled pinion at their upper end, the endwise-adjustable hand-shaft carrying gears that severally engage said pinions, and the hand-wheel or crank on the front end of said shaft, for the purposes set forth.

15. In combination with the table having a single throat-opening, of a pair of swinging saw-carrier arms having the saw-arbors mounted thereon, a fulcrum-bar supporting the rear ends of the carrier-arms, said carrier-arms each connected with said fulcrum-bar by a swiveling joint at one side of the arm, and a slide-joint at the other side of the arm, means for elevating and depressing the front ends of the several carrier-arms and guides that give lateral motion thereto as the saw approaches and recedes from the throat-opening.

16. The carrier-arm fulcrum-joint, comprising the collar or circumferentially-grooved sleeve adjustably secured to the fulcrum-bar, the bearing-box rotatively supported on the sleeve and adjustable within a longitudinal opening in the carrier-arm, the swivel-pins retaining said box in the arm, and the adjusting-screws fitted longitudinally in said arm and bearing against the rounded ends of said box, for the purpose set forth.

17. In combination with the oppositely-tilting table, the saw-carrier arms bifurcated at their rear ends, and the fulcrum-support for said arms; of the bifurcated rear standard carrying the seat for the rocker-segment of the table supported thereon, the two limbs of said standard respectively disposed through the openings between the limbs of the respective saw-carrier arms, and a bar or girth arranged across the frame within the circuit of the saw-operating belts, and having the feet of the standard separately attached thereto, for the purpose set forth.

18. In a circular-saw machine, the combination, in relative arrangement as described, with the table, the carrier, and the operating-belt; of the saw-arbor provided with the saw-supporting collar, and the take-up collar, the hollow centrally-webbed pulley having its central web secured to said arbor by the spline-key and set-screw, the journal-boxes respectively embracing the portions of said arbor between said collars and the central pulley-web, their inner ends closely adjacent to but not in contact with said web, and the carrier-head or adjustable support-plate connecting said journal-boxes around the pulley and belt-space, all substantially as shown and described.

19. In combination with the saw-arbor, and the carrier head or support whereon said arbor is mounted; of the arbor journal-boxes having lateral ears bolted to the top of the head, and provided with the downwardly-extending tongue perpendicular to the axis, and secured to the side of the head with a deadening packing material of medium density disposed between the adjacent surfaces of said tongue and supporting-head, all substantially as shown and described for the purpose set forth.

20. The combination, with the table having the throat-slot, and the saw-carrier arm swinging beneath said table, of the saw-arbor, and the bearing-support or carrier-head therefor mounted on said carrier-arm and centrally sustained thereon at its front and rear ends, and provided at either side with screws fitted therein and acting against the carrier-arm for correcting the alinement of the saw-arbor and saw in relation to the swing of the carrier-arm and the plane of the table.

21. The combination, with the carrier-arm arranged for elevating and depressing the saw, the operating-pulley, the operating-belt, the saw-arbor, its pulley, and the journal-boxes therefor; of a carrier head or support for said journal-boxes, having a longitudinal neck supported between adjustable side plates, said side plates mounted in connection with said carrier-arm, and the adjusting and binding screws 25, for effecting and retaining adjustment of said side plates, carrier-head and saw-arbor laterally in relation to the carrier-arm, substantially as set forth.

22. In a circular-saw machine, in combination, the pivoted saw-carrier arm provided with the open end having an inwardly-projecting wing $F^5$, and the cylindrical side bearings, the movable carrier-head having its neck $F^4$ fitting between said side bearings, and its fore end supported on said wing, the screws 20 for effecting oscillative adjustment of said head in relation to the arm, the arbor journal-boxes mounted on said head, and binding-screws 25 that confine the carrier-head in position.

23. In a circular-saw machine, the saw-carrier arm having the inwardly-projecting wing $F^5$, and the side bearings 21, the carrier-head having its neck fitted in said bearings, the longitudinally-disposed adjusting-screw 23 threaded into a cross-bar on said arm and acting against the carrier-head in opposition to the strain of the operating-belt, in combination with the saw-arbor carried in bearings mounted on said head, and the operating-belt for driving said arbor.

24. The saw-carrier arm provided with side bearings, and having a cross-bar provided with a pocket, the movable carrier-head its neck fitting said side bearings, and having a pocket at the end of the neck, a longitudinal adjusting-bolt threaded to the cross-bar and acting against the carrier-head, and an expansive spring arranged in said pockets between the cross-bar and carrier-head, substantially as set forth.

25. The combination with the saws, saw-carriers, their elevating-racks and gearing, of the endwise-adjustable hand-shaft having thereon a pair of oppositely-facing beveled gears, the beveled pinions and worm-shafts having their axes in different planes transverse to the axis of said hand-shaft and said beveled pinions respectively adapted for engagement and disengagement with one of said gears as the hand-shaft is shifted, the hand-wheel or crank on the outer end of said shaft, a suitable spring pressing forward said shaft, the drop bar or latch for locking the shaft at adjusted position and a foot-lever and connection for lifting said drop-bar.

26. In a circular-saw machine, the combination, with the swinging saw-carriers, the saws, and saw-operating mechanism; of a table tiltable to both right and left inclination, a gear-segment connected with and depending from said table, the hand-wheel shaft mounted in the frame and provided with gearing for operating said saw-carriers and having a gear for operating said table-tilting segment adapted to be shifted into and out of engagement with the table-tilting gear, as described, and the tilting of the table effected either by said hand-wheel and gearing, or directly by swinging the table-top by hand.

27. In a circular sawing machine, the combination, substantially as described, with the hand-wheel and the hand-wheel shaft having two gears mounted thereon that respectively actuate right and left saw-elevating mechanisms, of the pinion 31 fixed on said shaft, the tilting table having a gear-segment attached thereto and operative from said hand-shaft pinion, a forwardly-pressing spring engaging said shaft, and the drop-bar 36 arranged for retaining and releasing said hand-shaft and gearing at its several positions of adjustment in or out of engagement with said elevating mechanism or the table-tilting gear, as set forth.

28. The combination in a machine embodying the right and left carrier-arms, and mechanisms for individually elevating and depressing the said carriers, and a laterally-tiltable table-top; of pinions for separately operating the carrier-elevating mechanisms, the tilting gear-segment connected with said table, the endwise-adjustable hand-shaft having thereon gears for respectively engaging at different positions of the shaft adjustment, with the several carrier-actuating pinions, and a gear for operating the table-tilting segment, and means for locking the hand-shaft adjustment and for releasing said lock, substantially as set forth.

29. In a circular-saw machine having a plurality of swinging saw-carriers, and operating mechanisms whereby said carriers are elevated to bring the saws severally into working position, the combination with the carriers and carrier-operating gearing, of an automatic locking mechanism that engages with the actuating member and prevents actuation of the operating-gearing of one of said carriers while the other carrier is elevated, and a lug, detent or finger moving with the carrier for tripping or releasing the lock when the carrier is depressed, or at idle position.

30. The combination with the pair of carriers having the saw-arbors mounted thereon, the endwise-adjustable hand-shaft, and the gearing for separately elevating and depressing said carriers by operation of said hand-shaft, of automatic lock-levers that respectively engage said hand-shaft and prevent its adjustment for the elevation of one of said carriers, except when the other carrier is at depressed position, and a detent or finger connected with each carrier that acts upon the lock-lever for releasing the lock when the carrier is at depressed position, substantially as set forth.

31. In a circular-saw machine, the inclined belt-rest board having the rounded fore end 45 adapted to press the belt upward and effect a reflex curvature thereon immediately in rear of the arbor-pulley and act as a brake on said belt when the carrier-arm and saw are dropped to idle position; in combination, with the carrier-arm, the saw-arbor, its pulley and the operating-belt, substantially as set forth.

32. In a circular-saw machine provided with an operating-shaft with pulleys, a pair of swinging carrier-arms having the saw-arbors respectively mounted thereon, and belts from the operating-pulleys to the saw-arbor pulleys; the combination of the inclined stationary rest-boards extending beneath the carrier-arms from the operating-pulleys along the under line of the belts, their fore ends supported to stand adjacent to the low position of the arbors, and the stationary guard-plate fixed upon the frame and extending transversely over the tops of said operating-pulleys near their surface under the belts and adjacent to the point where the belt leaves the pulley-face when the saw-arbor is elevated; said belts and arbors being rendered active by elevation of the saw-arbor carrier, and idle by depression of the saw-arbor carrier, all substantially as and for the purposes set forth.

33. The saw-table having a plain top surface without grooves or openings therein other than the saw-throat, and provided with square edges having downwardly-projecting flanges, with open spaces at the corners thereof; in combination with a circular saw, and a guiding rest or gage supported and adjustable upon the flanged edge of the table, for the purpose set forth.

34. A saw-table for circular sawing machines, provided with guiding-lips along its edges, said lips made shorter than the side of the table and affording openings or unribbed spaces at the angles of the table, as shown and described.

35. In a circular-saw machine, and in combination as described, with the tiltable table having a saw-throat therethrough, and the upwardly and downwardly movable saw-carrier having the saw-arbor supported thereon, and means for moving said carrier, of the back guard consisting of the forwardly-curved blade 42, its top end terminating below the cutting limit of the saw, a laterally-adjustable support-bracket for said back guard attached to the movable saw-carrier head to rise and fall with the carrier and saw, the pivot-bolt 44 connecting said guard-blade to its support, and the series of holes concentric to said pivot, and engaging stud 46 at the heel of said blade, substantially as shown and for the purposes set forth.

36. In combination with the table-top having the central opening and removable throat-block therein, the swinging carrier-arm, the saw-arbor mounted in bearings on the carrier-head, and having its back collar provided with a recess or notch therein; of the locking-dog consisting of a lever 13 centrally pivoted on the carrier-head or arbor journal-box beneath the throat-block opening, and having its fore end adapted to lock into said recessed collar and its rear part extending in a long arm adjacent to the side of the saw, at position for convenient manipulation by a bar or wrench introduced through said throat-block opening; for prying back the end of the lever and forcing said dog out from engagement with the collar.

37. In combination with the saw-table-supporting frame, the operating-shaft, driving-pulley, and clutch shipper-rod; of the reversible shipper-treadle comprising the upwardly-projecting arm pivotally connected at its heel with the lower front corner of the frame, said projecting arm having thereon the forwardly-projecting foot-pad and the reversible upright laterally-projecting foot-pad, and the hinging eye connecting its end with the shipper-rod, substantially as set forth.

38. The lag-joint scale comprising the right and left series of differential graduations corresponding to different equal divisions of a circumference, and a central column of indicating-figures with directing-lines leading from said figures to the opposite graduations, in combination with the tilting machine-table provided with a segment or dial carrying said scale, substantially as shown and described.

Witness my hand this 25th day of August, A. D. 1896.

FRANK A. HUMPHREY.

Witnesses:
ELLA P. BLENUS,
SIMEON E. KING.